United States Patent
Jeon

(10) Patent No.: US 10,037,619 B2
(45) Date of Patent: Jul. 31, 2018

(54) METHOD AND SYSTEM FOR GENERATING MOTION SEQUENCE OF ANIMATION, AND COMPUTER-READABLE RECORDING MEDIUM

(71) Applicant: ANIPEN INC., Seongnam-si (KR)

(72) Inventor: Jae Woong Jeon, Seoul (KR)

(73) Assignee: ANIPEN INC., Seongnam-si (KR)

( * ) Notice: Subject to any disclaimer, the term of this patent is extended or adjusted under 35 U.S.C. 154(b) by 36 days.

(21) Appl. No.: 14/763,499

(22) PCT Filed: Jan. 24, 2014

(86) PCT No.: PCT/KR2014/000707
§ 371 (c)(1),
(2) Date: Jul. 24, 2015

(87) PCT Pub. No.: WO2014/116056
PCT Pub. Date: Jul. 31, 2014

(65) Prior Publication Data
US 2016/0005207 A1    Jan. 7, 2016

(30) Foreign Application Priority Data

Jan. 24, 2013  (KR) .................. 10-2013-0008034
Aug. 28, 2013  (KR) .................. 10-2013-0102747
Nov. 8, 2013   (KR) .................. 10-2013-0135624

(51) Int. Cl.
*G06T 13/80* (2011.01)
*G06T 13/20* (2011.01)
(Continued)

(52) U.S. Cl.
CPC ............... *G06T 13/80* (2013.01); *G06T 7/20* (2013.01); *G06T 13/20* (2013.01); *G06T 13/40* (2013.01); *G06T 19/006* (2013.01)

(58) Field of Classification Search
None
See application file for complete search history.

(56) References Cited

U.S. PATENT DOCUMENTS

2005/0134598 A1   6/2005  Baxter et al.
2010/0214313 A1*  8/2010  Herman .................. A63F 13/10
                                                 345/593
(Continued)

FOREIGN PATENT DOCUMENTS

JP   2003-334386 A    11/2003
KR   10-2003-0056294 A    7/2003
(Continued)

OTHER PUBLICATIONS

Jeon, Jaewoong, et al. "A sketch interface to empower novices to create 3D animations." Computer Animation and Virtual Worlds 21.3-4 (May 2010): 423-432.*

(Continued)

*Primary Examiner* — Yi Wang
(74) *Attorney, Agent, or Firm* — Dinsmore & Shohl LLP

(57) ABSTRACT

One aspect of the present invention provides a method for generating a motion sequence of an animation, the method comprising the steps of: generating a line of movement indicating a path along which a character moves, with reference to a first user manipulation inputted with respect to a reference plane; specifying the line of movement, a section included in the line of movement and a point on the line of movement with reference to a second user manipulation inputted with respect to the reference plane; and generating a motion sequence which enables the character to carry out assigned motions by assigning a motion to the line of movement, the section or the point with reference to a third user manipulation inputted with respect to the reference (Continued)

plane when the character is located at the line of movement, the section or the point to which the motion is assigned.

13 Claims, 14 Drawing Sheets

(51) Int. Cl.
*G06T 7/20* (2017.01)
*G06T 13/40* (2011.01)
*G06T 19/00* (2011.01)

(56) References Cited

U.S. PATENT DOCUMENTS

2012/0122570 A1\* 5/2012 Baronoff ............... A63F 13/216
463/31
2013/0141427 A1\* 6/2013 Lucas ..................... G06T 13/20
345/419
2013/0223673 A1\* 8/2013 Davis ....................... G06K 9/78
382/100

FOREIGN PATENT DOCUMENTS

KR          10-0623173 B1      9/2006
KR     10-2008-0052272 A       6/2008

OTHER PUBLICATIONS

Korean Intellectual Property Office, International Search Report and Written opinion for PCT Application PCT/KR2014/000707, dated May 19, 2014.

\* cited by examiner

METHOD AND SYSTEM FOR GENERATING MOTION SEQUENCE OF ANIMATION, AND COMPUTER-READABLE RECORDING MEDIUM

FIELD OF THE INVENTION

The present invention relates to a method, system, and computer-readable recording medium for generating a motion sequence of an animation. More specifically, the present invention relates to a method, system, and computer-readable recording medium for generating a movement path indicating a path along which a character moves, with reference to a user operation inputted with respect to a reference plane, and assigning a motion of the character to the movement path, at least one section included in the movement path, or at least one point on the movement path, thereby generating a motion sequence by which the character carries out the motion when the character is located at the movement path, section, or point to which the motion has been assigned.

BACKGROUND

Three-dimensional (3D) animations are frequently found in movies or television programs. 3D animation authoring tools are employed in authoring such 3D animations, but it is complicated and difficult to use conventional 3D animation authoring tools, and thus it is general that only trained experts can use the tools.

Recently, due to the development of the Internet and multimedia, there are a growing number of general users who intend to personally author and use 3D animations beyond just watching them.

Therefore, there is a growing expectation for animation authoring tools by which even non-experts can easily author 3D animations and precisely input paths and motions of objects.

SUMMARY OF THE INVENTION

One object of the present invention is to solve all the above problems in prior art.

Another object of the invention is to generate a movement path indicating a path along which a character moves, with reference to a user operation inputted with respect to a reference plane, and assign a motion of the character to the movement path, at least one section included in the movement path, or at least one point on the movement path, thereby generating a motion sequence by which the character carries out the motion when the character is located at the movement path, section, or point to which the motion has been assigned.

Yet another object of the invention is to provide a user interface to allow a user to freely and easily control motions carried out while moving along a movement path of a character.

According to one aspect of the invention to achieve the objects as described above, there is provided a method for generating a motion sequence of an animation, comprising the steps of: (a) generating a movement path indicating a path along which a character moves, with reference to a first user operation inputted with respect to a reference plane; (b) specifying the movement path, at least one section included in the movement path, and at least one point on the movement path, with reference to a second user operation inputted with respect to the reference plane; and (c) assigning at least one motion to at least one of the movement path, the at least one section, and the at least one point, with reference to a third user operation inputted with respect to the reference plane, to generate a motion sequence by which the character carries out the at least one assigned motion when the character is located at the at least one of the movement path, the at least one section, and the at least one point to which the at least one motion has been assigned.

According to another aspect of the invention, there is provided a system for generating a motion sequence of an animation, comprising: a movement path management unit for generating a movement path indicating a path along which a character moves, with reference to a first user operation inputted with respect to a reference plane, and specifying the movement path, at least one section included in the movement path, and at least one point on the movement path, with reference to a second user operation inputted with respect to the reference plane; and a motion sequence management unit for assigning at least one motion to at least one of the movement path, the at least one section, and the at least one point, with reference to a third user operation inputted with respect to the reference plane, to generate a motion sequence by which the character carries out the at least one assigned motion when the character is located at the at least one of the movement path, the at least one section, and the at least one point to which the at least one motion has been assigned.

According to yet another aspect of the invention, there is provided a method for generating a motion sequence of an animation, comprising the steps of: (a) establishing at least one motion to be carried out by a character, with reference to a first user operation inputted with respect to a reference plane; and (b) generating a movement path indicating a path along which the character moves, with reference to a second user operation inputted with respect to the reference plane in a state in which the at least one motion has been established, and generating a motion sequence by which the character carries out the at least one established motion when the character is located at the generated movement path.

According to still another aspect of the invention, there is provided a system for generating a motion sequence of an animation, comprising: a motion sequence management unit for establishing at least one motion to be carried out by a character, with reference to a first user operation inputted with respect to a reference plane; and a movement path management unit for generating a movement path indicating a path along which the character moves, with reference to a second user operation inputted with respect to the reference plane in a state in which the at least one motion has been established, wherein the motion sequence management unit generates a motion sequence by which the character carries out the at least one established motion when the character is located at the generated movement path.

In addition, there are further provided other methods and systems to implement the invention, as well as computer-readable recording media having stored thereon computer programs for executing the methods.

According to the invention, there is provided an animation authoring tool by which even non-experts can easily author 3D animations and precisely input paths and actions of moving objects (i.e., characters):

According to the invention, a user may establish a movement path and motions of a character in an animation by simply performing touch operations (e.g., tap, hold, drag, pinch, etc.), mouse operations, motion operations, and the like, so that the user may precisely and proficiently adjust a motion sequence of the animation using a portable terminal device like a smart phone or a tablet PC.

DETAILED DESCRIPTION OF THE PREFERRED EMBODIMENTS

Figure 1:
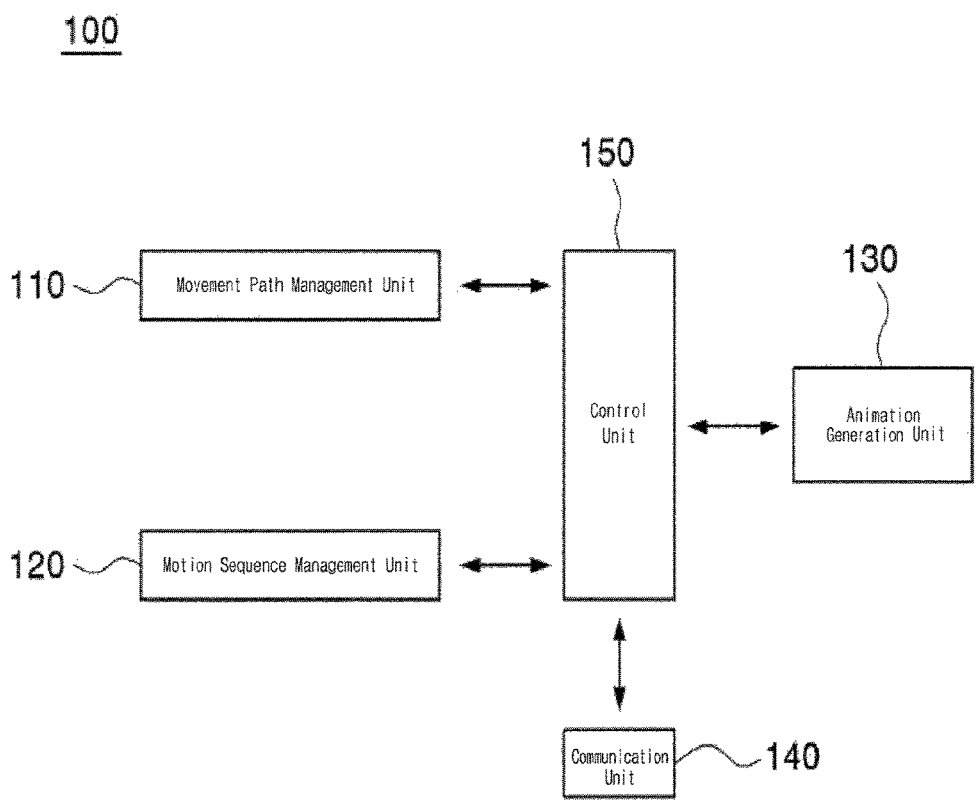
FIG. 1 illustratively shows the internal configuration of a motion sequence generation system according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of a Motion Sequence Generation System

Hereinafter, the internal configuration of the motion sequence generation system crucial for implementing the present invention and the functions of the respective components thereof will be discussed.

According to one embodiment of the invention, any type of device having a memory means and a microprocessor for computing capabilities, such as a personal computer (e.g., a desktop computer, a notebook computer, etc.), a server, a workstation, a personal digital assistant (PDA), a web pad, a mobile phone, a smart phone, and a tablet PC, may be adopted as the motion sequence generation system of the invention. Particularly, the motion sequence generation system according to one embodiment of the invention may comprise a variety of input means such as a touch screen that may receive a touch operation from a user, and a motion input means that may receive a motion operation from the user using an infrared sensor, an acceleration sensor, and the like, and may comprise a display means that may display an animation including a motion sequence of a character.

FIG. 1 illustratively shows the internal configuration of a motion sequence generation system according to one embodiment of the invention.

Referring to FIG. 1, a motion sequence generation system 100 according to one embodiment of the invention may comprise a movement path management unit 110, a motion sequence management unit 120, an animation generation unit 130, a communication unit 140, and a control unit 150. According to one embodiment of the invention, at least some of the movement path management unit 110, the motion sequence management unit 120, the animation generation unit 130, the communication unit 140, and the control unit 150 may be program modules to communicate with an external system (not shown). The program modules may be included in the motion sequence generation system 100 in the form of operating systems, application program modules and other program modules, while they may be physically stored on a variety of commonly known storage devices. Further, the program modules may also be stored in a remote storage device that may communicate with the motion sequence generation system 100. Meanwhile, such program modules may include, but not limited to, routines, subroutines, programs, objects, components, data structures, and the like for performing specific tasks or executing specific abstract data types as will be described below in accordance with the invention.

First, according to one embodiment of the invention, the movement path management unit 110 may function to generate a movement path indicating a path along which a character moves on a reference plane, which is a virtual plane defined by a display screen where the character is displayed, with reference to a first user operation inputted with respect to the reference plane. Here, the first user operation may specify a virtual straight or curved line extending from a first point to a second point on the reference plane, and may include, for example, a touch operation extending from a first point to a second point on the display screen, and a motion operation to move a terminal device including a motion input means from a first location to a second location or to change a posture of the terminal device from a first posture to a second posture.

Further, according to one embodiment of the invention, the movement path management unit 110 may function to specify at least one section included in the previously generated movement path or at least one point on the previously generated movement path, with reference to a second user operation inputted with respect to the reference plane. Here, the second user operation may specify a boundary of at least one section included in the movement path or a location of at least one point on the movement path, and may include, for example, a touch operation to draw a virtual line intersecting at least one point on the movement path or to directly select at least one point on the movement path, and an operation to change a location or posture of a terminal device including a motion input means. According to one embodiment of the invention, a length of at least one section included in the movement path or a location of at least one point on the movement path may be changed by additionally inputted user operations.

Next, according to one embodiment of the invention, the motion sequence management unit 120 may function to assign a motion of the character (or an attribute value for an action) to the entire movement path, at least one section included in the movement path, or at least one point on the movement path, with reference to a third user operation inputted with respect to the reference plane, thereby generating a motion sequence by which the character carries out an action according to the motion when the character is located at the movement path, section, or point to which the motion has been assigned. Here, the motion that may be assigned to the movement path, section, or point may include a variety of actions such as walking, running, jumping, rolling, crawling, punching, shrugging, shaking, talking, singing, and motions expressing emotional states of the character. However, it is noted that the type of motion according to the invention is not necessarily limited to the foregoing, and may be added or changed without limitation as long as the objects of the invention may be achieved.

Meanwhile, according to one embodiment of the invention, there may be provided a graphical user interface (GUI) to assist a user in inputting a first user operation, a second user operation, a third user operation, and the like to establish a movement path, sections, or points and assign motions to the movement path, sections, or points. Specifically, according to one embodiment of the invention, the graphical user interface may comprise graphical elements indicating various motions of the character which may be assigned to the movement path, sections, or points, and a pod controller that is displayed to visually include the graphical elements. The graphical elements and the pod controller may be displayed in correspondence to the movement path, sections, or points.

Next, according to one embodiment of the invention, the animation generation unit 130 may function to generate, with reference to the previously generated movement path, sections, or points and the information on the motions assigned thereto (i.e., the motion sequence), an animation including a scene in which the character carries out at least one motion assigned to the entire movement path, sections, or points while moving along the movement path.

Further, according to one embodiment of the invention, the animation generation unit 130 may function to generate an augmented reality (AR) video by combining the animation generated according to the motion sequence of the character with real-world images inputted from a camera (not shown). More specifically, the animation generation unit 130 according to one embodiment of the invention may track coordinates of the real-world images and extract 3D mapping coordinates therefrom using simultaneous localization and mapping (SLAM) techniques, may determine coordinates at which the animation according to the motion sequence of the character is to be displayed in the real-world images, with reference to information on the tracked coordinates and the extracted 3D mapping coordinates, and may combine the animation whose coordinates for display thereof have been determined with the real-world images to generate the augmented reality video.

Next, the communication unit 140 according to one embodiment of the invention may function to enable the motion sequence generation system 100 to communicate with an external device.

Lastly, the control unit 150 according to one embodiment of the invention may function to control data flow among the movement path management unit 110, the motion sequence management unit 120, the animation generation unit 130, and the communication unit 140. That is, the control unit 150 may control inbound data flow or data flow among the respective components of the motion sequence generation system, such that the movement path management unit 110, the motion sequence management unit 120, the animation generation unit 130, and the communication unit 140 may carry out their particular functions, respectively.

Figure 2A:
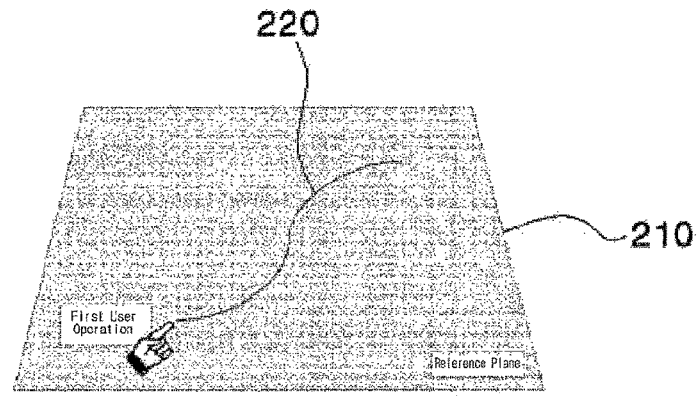
FIGS. 2A to 2C illustratively show how a motion sequence is generated according to one embodiment of the invention.
Figure 2B:
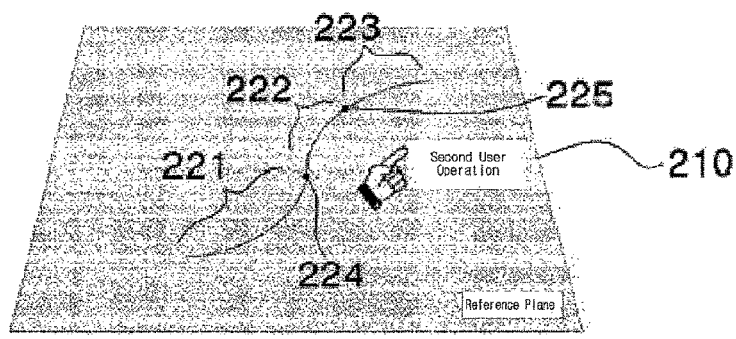
Figure 2C:
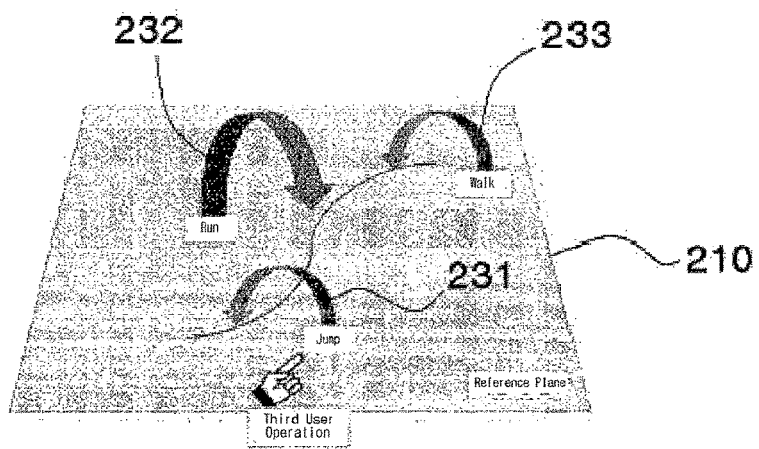

FIGS. 2A to 2C illustratively show how a motion sequence is generated according to one embodiment of the invention.

First, referring to FIG. 2A, a user may use various manners of operation such as a touch operation, a mouse operation, and a motion operation with respect to a reference plane 210 to generate a movement path 220 along which a character or object is to be moved.

Next, referring to FIG. 2B, the user may use various manners of operation such as a touch operation, a mouse operation, and a motion operation with respect to the reference plane 210 to divide the movement path 220 into a plurality of sections 221 to 223 and segment the movement path 220, or to specify at least one point 224 and 225 on the movement path 220. Here, the user may perform an operation to draw a line intersecting the movement path 220 so that the movement path 220 is segmented or a point on the movement path 220 is specified by the point of intersection. Further, the user may perform an operation to directly indicate a point on the movement path 220 to specify the point on the movement path 220.

Next, referring to FIG. 2C, the user may assign various motions 231 to 233 to the respective sections 221 to 223 of the segmented movement path, thereby generating a motion sequence in which the motions 231 to 233 are combined with the respective sections 221 to 223 of the movement path. Further, although not shown, the user may assign various motions to the entire movement path or to at least one point specified on the movement path, thereby generating a motion sequence by which the character carries out the various assigned motions when the character is located at the movement path, sections, or points to which the motions have been assigned.

Figure 3A:
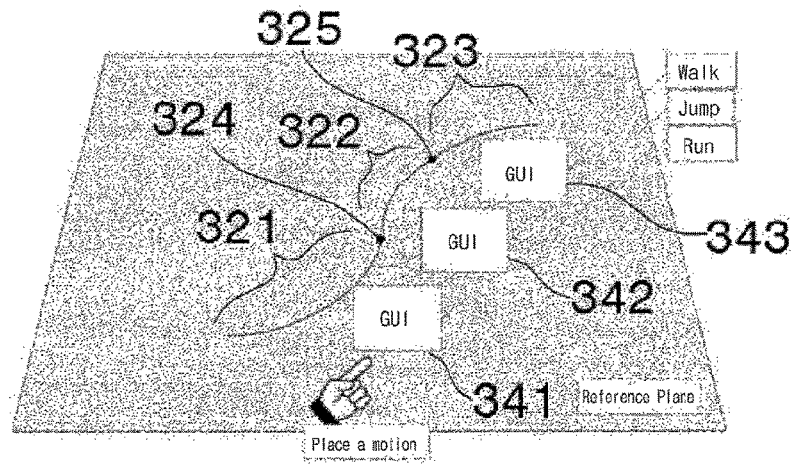
FIGS. 3A and 3B illustratively show how a motion is assigned to each section of a movement path according to one embodiment of the invention.
Figure 3B:
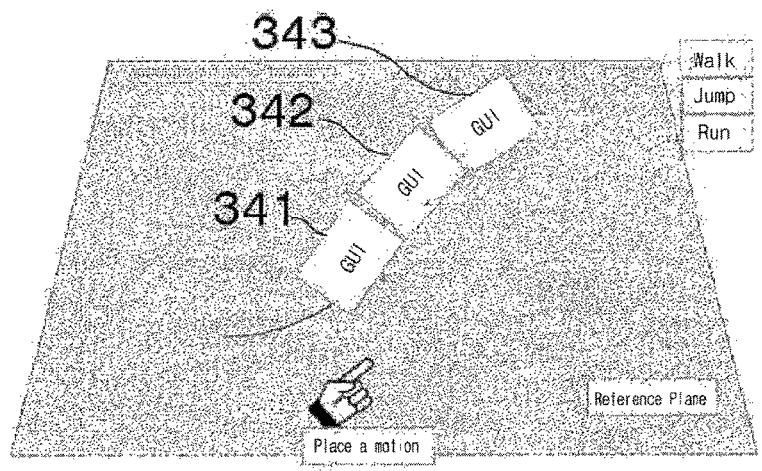

FIGS. 3A and 3B illustratively show how a motion is assigned to each section of a movement path according to one embodiment of the invention.

First, referring to FIG. 3A, graphical user interfaces 341 to 343 for assisting in assigning motions may be displayed in correspondence to the respective sections of the movement path, and thus a user may easily select motions to be assigned to the sections via the graphical user interfaces 341 to 343 displayed in correspondence to the respective sections. Next, referring to FIG. 3B, the graphical user interfaces 341 to 343 displayed in correspondence to the respective sections of the movement path may be displayed such that they are adaptively placed according to the directions of the respective sections of the movement path, and thus the user may more easily select the motions to be assigned to the respective sections of the movement path.

Figure 4:
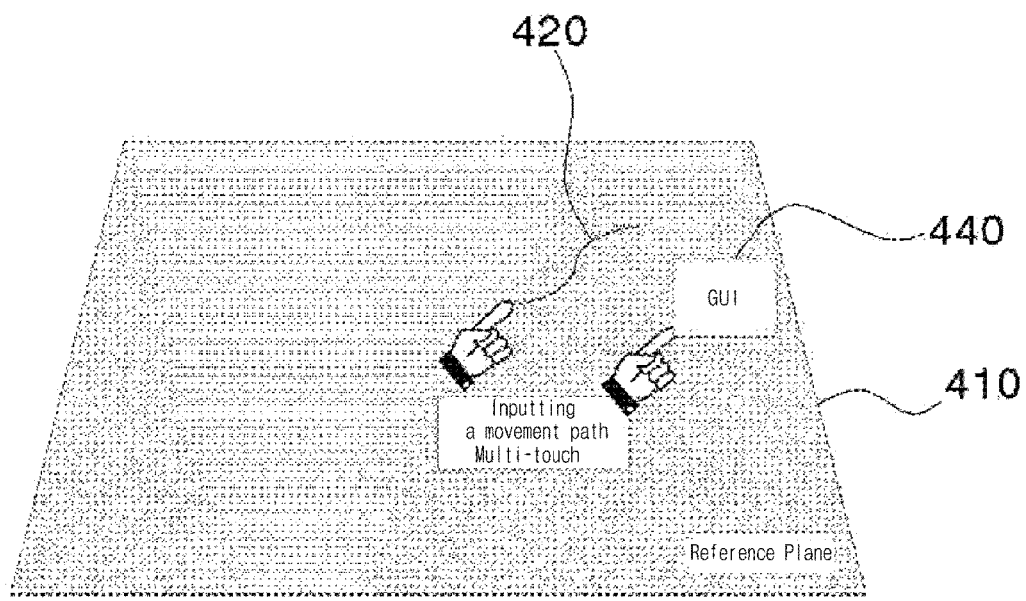
FIG. 4 illustratively shows how a motion sequence is generated according to another embodiment of the invention.

FIG. 4 illustratively shows how a motion sequence is generated according to another embodiment of the invention.

Referring to FIG. 4, a user may input a first user operation such as a touch operation, a mouse operation, and a motion operation with respect to a reference plane 410, thereby generating a movement path 420 along which a character or object is to be moved. Further, when a second user operation (e.g., a multi-touch operation, a shaking operation, etc.) is inputted with respect to the reference plane while the movement path is generated by the first user operation, a graphical user interface 440 may be provided to assist the user in establishing a motion. When the user selects a desired motion via the graphical user interface, the selected motion may be assigned to the movement path having been generated before the second user operation is inputted or to the movement path to be generated after the second user operation is inputted. Meanwhile, after the assigning of the motion to the movement path is finished, a user operation to generate the movement path may be inputted again.

That is, according to another embodiment of the invention, the generating of a movement path and the establishing of a motion may be performed in a different order when generating a motion sequence, and the motion may be assigned to the entire movement path in a state in which the movement path is not divided into a plurality of sections or no point is specified on the movement path. Further, according to one embodiment of the invention, a second user operation may be first inputted to select one of various motions that may be applied to a character, and a first user operation may be later inputted to generate a movement path of the character, thereby generating a motion sequence in which the previously selected motion is assigned to the movement path.

Meanwhile, although FIGS. 2A, 2B, 2C, 3A, 3B, and 4 mainly illustrate the cases in which motions are assigned to sections included in a movement path, the embodiments of the present invention are not necessarily limited to the foregoing. It is noted that the illustrations of FIGS. 2A, 2B, 2C, 3A, 3B, and 4 may also be likewise applied to the cases in which motions are assigned to the entire movement path or to at least one point on the movement path.

FIGS. 5 to 14 illustratively show the various configurations of a user interface to assist in generating a motion sequence according to one embodiment of the invention.

Figure 5:
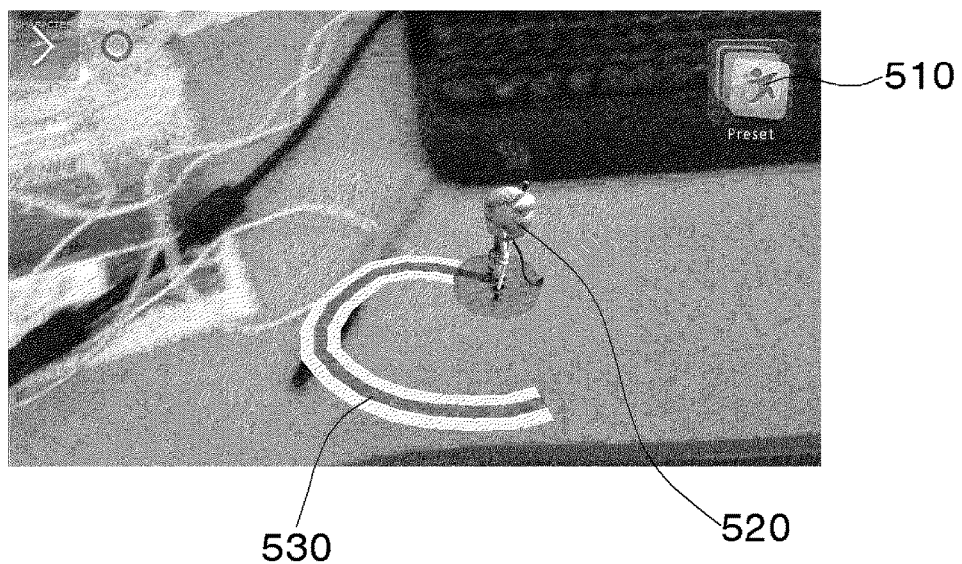
FIGS. 5 to 14 illustratively show the configuration of a user interface to assist in generating a motion sequence according to one embodiment of the invention.

Referring to FIG. 5, inputting a first user operation may cause a movement path 530 of a character 520 to be generated.

Figure 6:
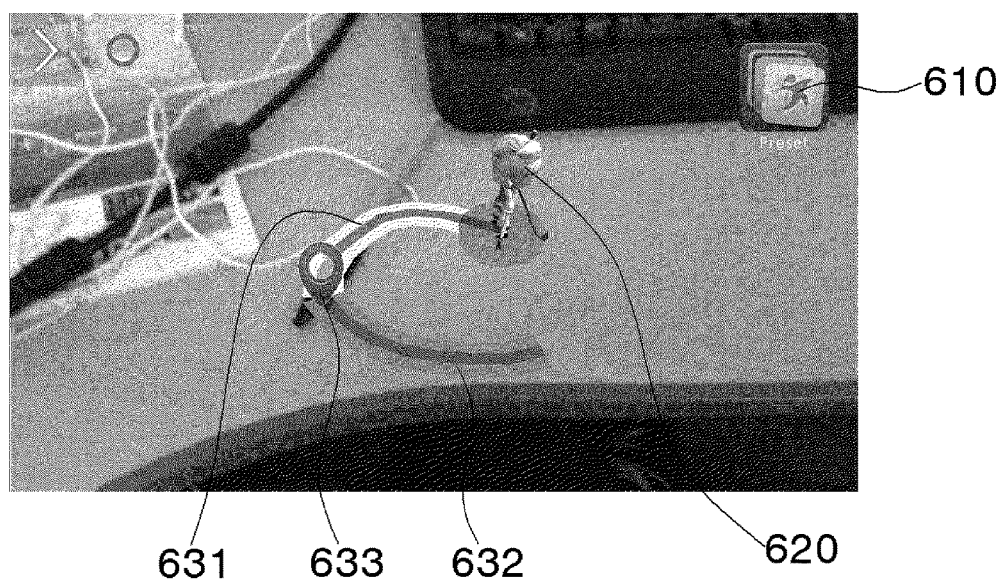

Referring to FIG. 6, inputting a second user operation may cause two sections 631 and 632 and one point 633 included in a movement path 630 to be specified.

Figure 7:
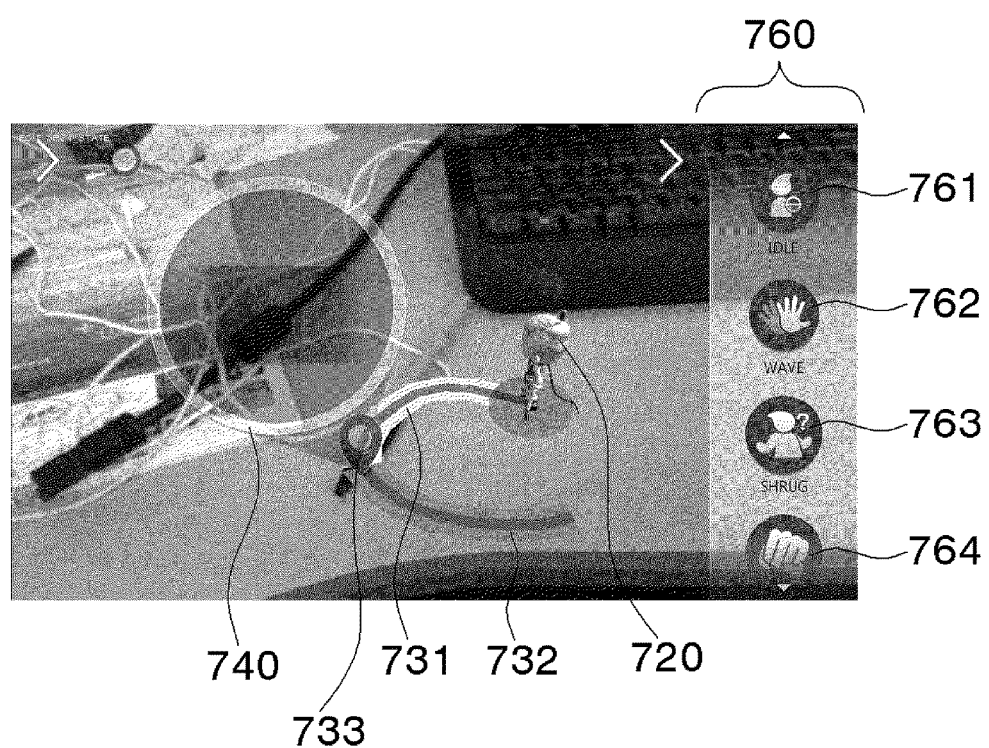

Referring to FIG. 7, in a state in which a movement path 730 of a character 720 and two sections 731 and 732 and one point 733 included in the movement path 730 are generated, a pod controller 740 may be provided to assist a user in assigning motions to the movement path 730, the sections 731 and 732, or the point 733. Specifically, when the specific point 733 is selected by a user operation, the pod controller 740, which may visually include graphical elements 761 to 764 corresponding to motions assignable to the point 733, may be displayed, possibly together with a selection menu 760 enumerating the graphical elements 761 to 764 corresponding to the motions assignable to the point 733 via the pod controller 740.

Figure 8:
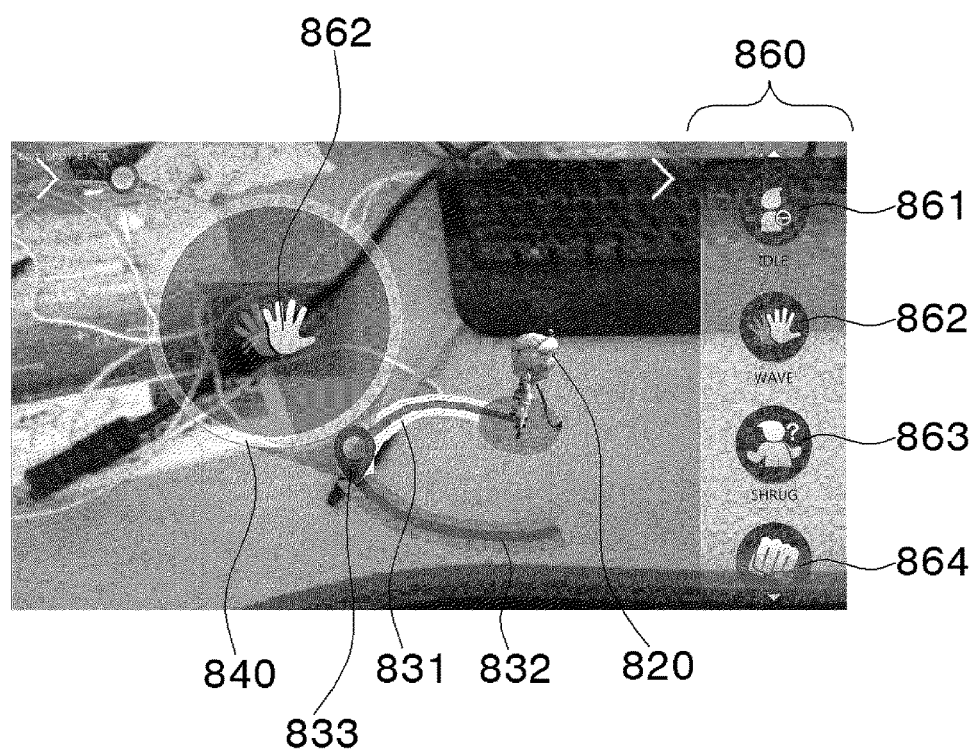

Referring to FIG. 8, in a state in which a point 833 on a movement path 830 of a character 820 is specified, and a pod controller 840 and a motion selection menu 860 corresponding to the point 833 are displayed, inputting a user operation to select a motion (e.g., hold and drag, drag and drop, etc.) may cause a graphical element 862 indicating the selected motion to be moved into the pod controller 840 and displayed as being included in the pod controller 840.

Figure 9:
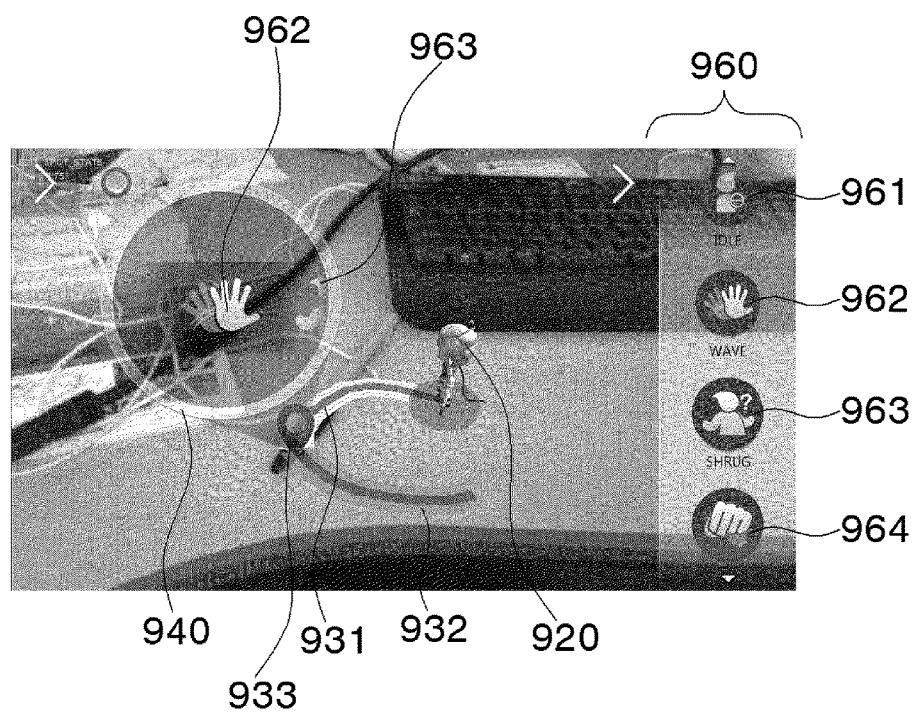

Referring to FIG. 9, a plurality of graphical elements 962 and 963 respectively indicating a plurality of motions may be included in a pod controller 940 displayed in correspondence to a point 933 on a movement path 930 of a character 920. The order of the plurality of graphical elements 962 and 963 included in the pod controller 940 may be controlled according to additionally inputted user operations.

Figure 10:
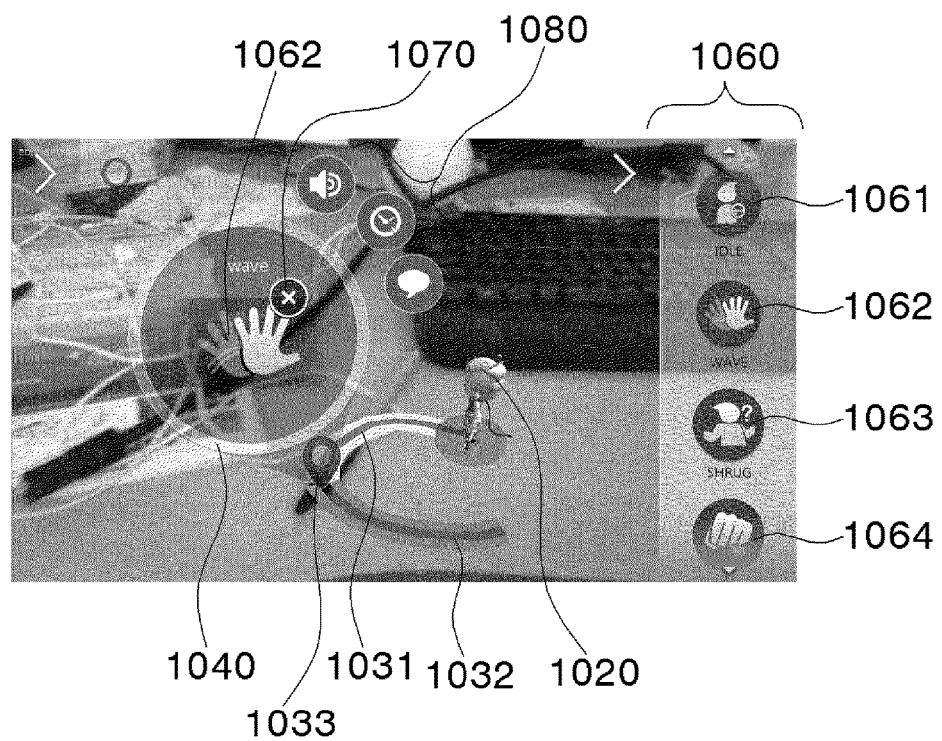

Referring to FIG. 10, in a state in which a graphical element 1062 indicating a motion of a character 1020 is displayed as being included in a pod controller 1040, selecting the motion by a user operation may cause the graphical element 1062 indicating the motion to be displayed with emphasis, and inputting an additional user operation may cause the graphical element 1062 to be deleted (1070). Further, inputting additional user operations may cause various attributes (e.g., a sound generated when the character 1020 carries out the motion, a time when the character 1020 carries out the motion, a line spoken by the character 1020 when carrying out the motion, etc.) to be established (1080).

Figure 11:
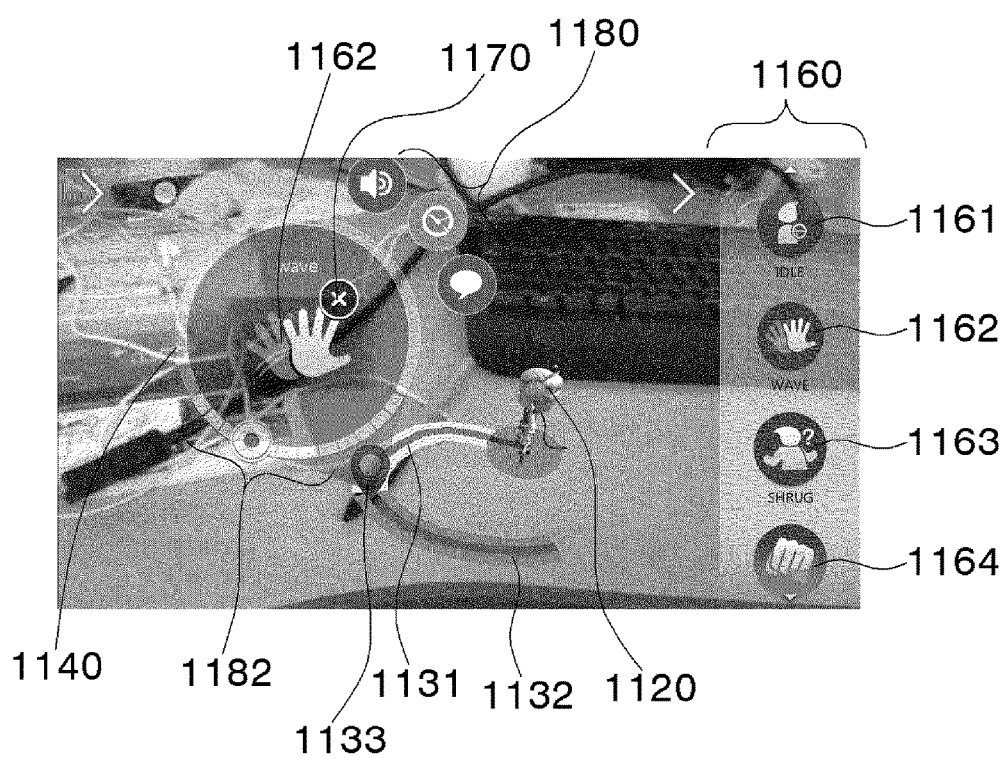

More specifically, referring to FIG. 11, in a state in which a specific graphical element 1162 indicating a motion of a character 1120 is displayed as being selected in a circular pod controller 1140, a time when the character 1120 carries out the motion corresponding to the specific graphical element 1162 may be adjusted with reference to a user operation inputted along the circumference of the circular pod controller 1140 (1182).

Further, although not shown, in a state in which a specific graphical element indicating a motion of a character is displayed as being selected in a circular pod controller, a direction in which the character carries out the motion corresponding to the specific graphical element may be specified with reference to a user operation inputted along the circumference of the circular pod controller.

Figure 12:
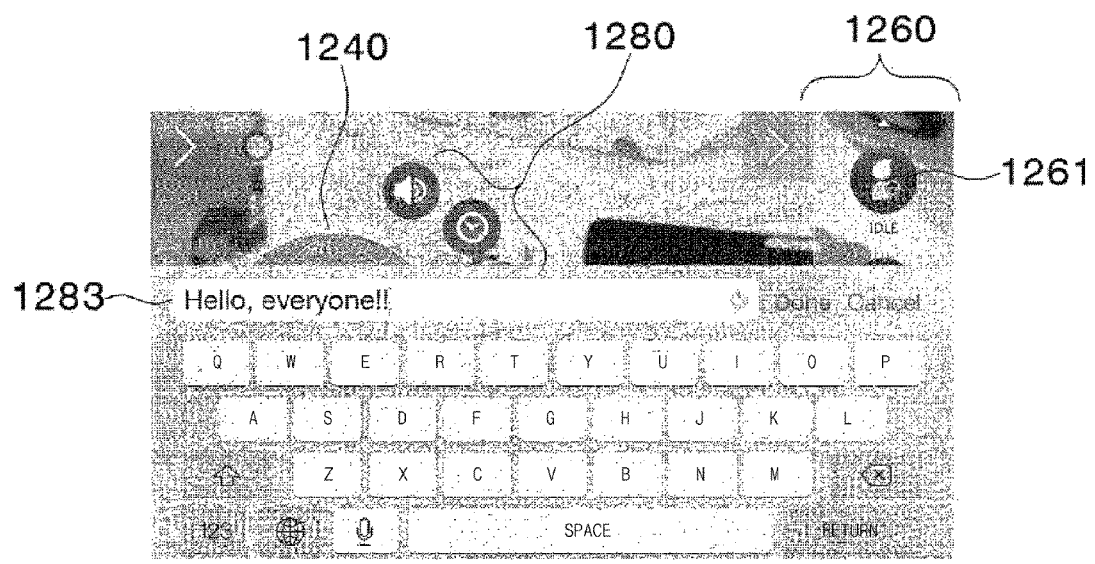

Furthermore, referring to FIG. 12, in a state in which a specific graphical element 1262 indicating a motion of a character 1220 is displayed as being selected in a pod controller 1240, inputting a character string 1283 according to a user operation may cause a line spoken by the character 1220 when carrying out the motion corresponding to the specific graphical element 1262 to be established.

Although FIGS. 5 to 12 mainly illustrate the cases in which motions are assigned to points on a movement path, the embodiments of the present invention are not necessarily limited to the foregoing. It is noted that the illustrations of FIGS. 5 to 12 may also be likewise applied to the cases in which motions are assigned to the entire movement path or to at least one section included in the movement path.

Figure 13:
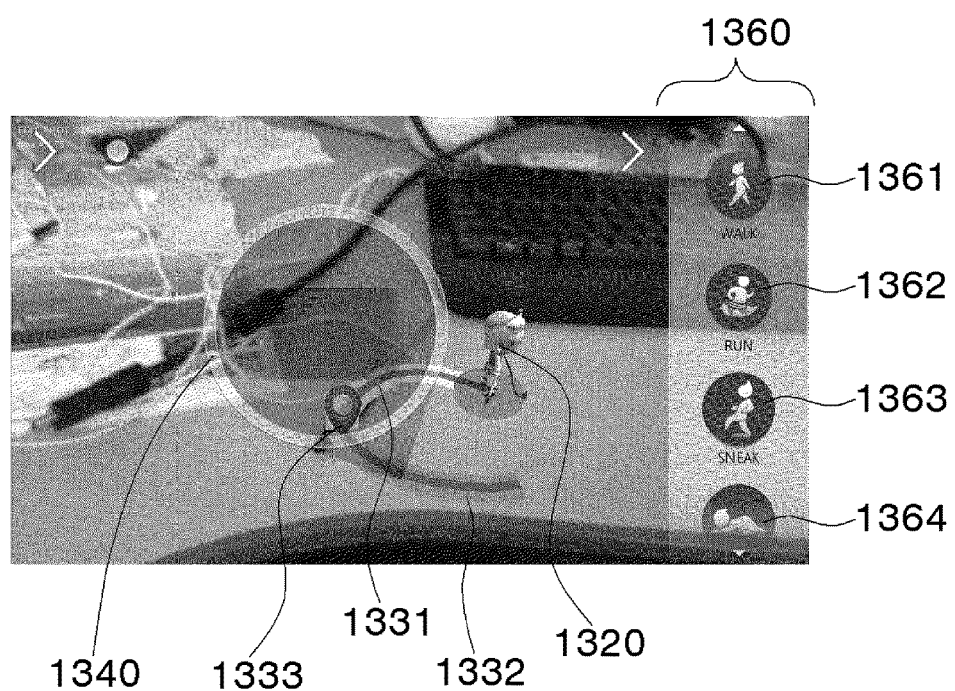

In this connection, referring to FIG. 13, when a specific section 1332 is selected by a user operation, a pod controller 1340, which may visually include graphical elements 1361 to 1364 corresponding to motions assignable to the section 1332, may be displayed, possibly together with a selection menu 1360 enumerating the graphical elements 1361 to 1364 corresponding to the motions assignable to the section 1332 via the pod controller 1340. Further, referring to FIG. 14, in a state in which a section 1432 included in a movement path 1430 of a character 1420 is specified, and a pod controller 1440 and a motion selection menu 1460 corresponding to the section 1432 are displayed, inputting a user operation to select a motion (e.g., hold and drag, drag and drop, etc.) may cause a graphical element 1462 indicating the selected motion to be moved into the pod controller 1440 and displayed as being included in the pod controller 1440.

Figure 14:
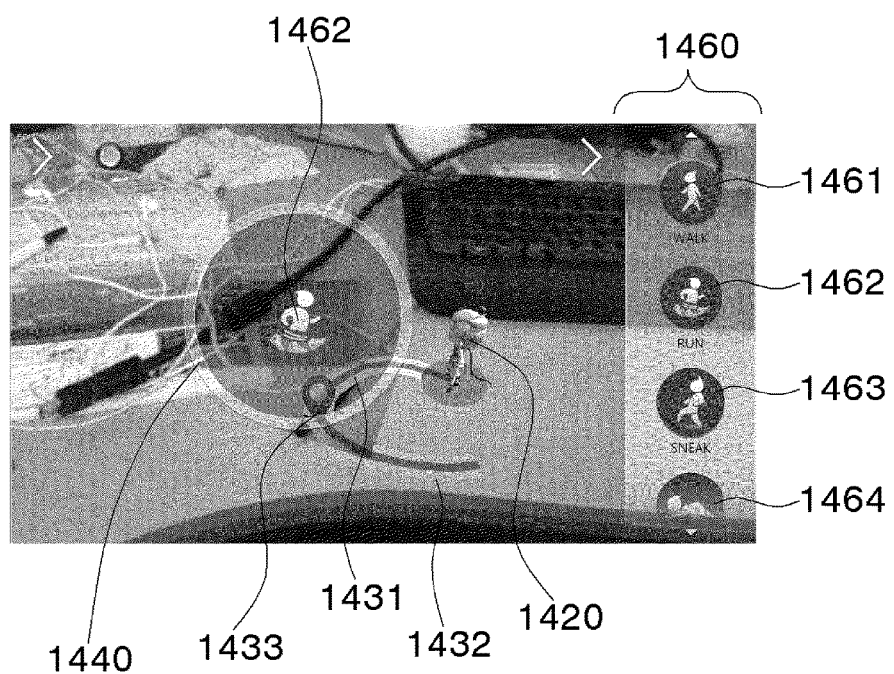

Meanwhile, comparing the embodiments of FIGS. 5 to 12 with those of FIGS. 13 and 14, the type of motions assignable to the point 733 (i.e., motions that may be carried out in place, such as keeping still 761, shaking 762, shrugging 763, and punching 764) and that of motions assignable to the section 1332 or the entire movement path (i.e., motions that may be carried out while moving, such as walking 1361, running 1362, sneaking 1363, and crawling 1364) may be established to be different from each other.

Meanwhile, referring to FIGS. 5 and 6, a user may import a motion sequence that has been previously generated and saved by the user or another user and apply it to the current character 520, 620, instead of generating a new motion sequence as described above. Further, the user may save a motion sequence that has been newly generated by the user so that the user or another user may utilize the motion sequence. For example, the user may select a preset icon 510, 610 displayed on the screen to import a previously saved motion sequence or to save a newly generated motion sequence.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for generating a motion sequence of an animation, comprising the steps of:
   (a) generating a movement path indicating a path along which a character moves, with reference to a first user operation being inputted with respect to a reference plane;
   (b) specifying at least one of at least one section included in the movement path and at least one point included in the movement path after the movement path is generated, with reference to a second user operation being distinguished from the first user operation and inputted with respect to the reference plane such that at least one of a boundary of the section included in the movement path and a location of the point included in the movement path is specified; and
   (c) assigning at least one motion to at least one of the movement path, the at least one section, and the at least one point, with reference to a third user operation being distinguished from the first or second user operation and inputted with respect to the reference plane such that the at least one of the movement path, the at least one section, and the at least one point corresponds to the motion, to generate a motion sequence by which the character carries out the at least one assigned motion when the character is located at the at least one of the movement path, the at least one section, and the at least one point to which the at least one motion has been assigned,
   wherein in the step (a), the first user operation is an operation to draw a virtual line extending from a first point to a second point on the reference plane, and
   wherein in the step (b), the at least one section and the at least one point are specified with reference to at least one of an operation to draw a virtual line intersecting the movement path and an operation to select the movement path, without the movement path being changed.

2. The method of claim 1, wherein at least one of addition, deletion, and order of the at least one motion is controllable.

3. The method of claim 1, wherein the at least one motion is assigned attributes for at least one of a sound generated when the character carries out the at least one motion, a time when the character carries out the at least one motion, a line spoken by the character when carrying out the at least one motion, and a direction in which the character carries out the at least one motion.

4. The method of claim 1, wherein a graphical user interface is provided to assist in inputting at least one of the first user operation, the second user operation, and the third user operation.

5. The method of claim 4, wherein the graphical user interface comprises at least one graphical element respectively indicating the at least one motion, and a pod controller including the at least one graphical element.

6. The method of claim 5, wherein at least one of addition, deletion, and order of the at least one motion is controlled with reference to a user operation inputted with respect to the graphical element and the pod controller.

7. The method of claim 5, wherein the at least one motion is assigned attributes for at least one of a sound generated when the character carries out the at least one motion, a time when the character carries out the at least one motion, a line spoken by the character when carrying out the at least one motion, and a direction in which the character carries out the at least one motion, with reference to a user operation inputted with respect to the graphical element and the pod controller.

8. The method of claim 5, wherein the graphical element and the pod controller are displayed in correspondence to the at least one of the path, the at least one section, and the at least one point.

9. The method of claim 1, further comprising the step of:
   (d) generating an animation including a scene in which the character carries out the at least one motion assigned to the at least one of the movement path, the at least one section, and the at least one point while moving along the movement path, with reference to the generated motion sequence.

10. The method of claim 1, further comprising the step of:
    (e) generating an augmented reality (AR) video by combining an animation including the motion sequence of the character with real-world images inputted from a camera.

11. The method of claim 10, wherein the step (e) comprises the steps of:

(e1) tracking coordinates of the real-world images and extracting 3D mapping coordinates of the real-world images using simultaneous localization and mapping (SLAM) techniques;

(e2) determining coordinates at which the animation according to the motion sequence of the character is to be displayed in the real-world images, with reference to information on the tracked coordinates and the extracted 3D mapping coordinates; and (e3) combining the animation whose coordinates for display thereof have been determined with the real-world images to generate the augmented reality video.

12. A non-transitory computer-readable recording medium having stored thereon a computer program for executing the method of claim 1.

13. A system for generating a motion sequence of an animation, comprising:

a movement path management unit for generating a movement path indicating a path along which a character moves, with reference to a first user operation being inputted with respect to a reference plane, and specifying at least one of at least one section included in the movement path and at least one point included in the movement path after the movement path is generated, with reference to a second user operation being distinguished from the first user operation and inputted with respect to the reference plane such that at least one of a boundary of the section included in the movement path and a location of the point included in the movement path is specified; and a motion sequence management unit for assigning at least one motion to at least one of the movement path, the at least one section, and the at least one point, with reference to a third user operation being distinguished from the first or second user operation and inputted with respect to the reference plane such that the at least one of the movement path, the at least one section, and the at least one point corresponds to the motion, to generate a motion sequence by which the character carries out the at least one assigned motion when the character is located at the at least one of the movement path, the at least one section, and the at least one point to which the at least one motion has been assigned, wherein the first user operation is an operation to draw a virtual line extending from a first point to a second point on the reference plane, and wherein the at least one section and the at least one point are specified with reference to at least one of an operation to draw a virtual line intersecting the movement path and an operation to select the movement path, without the movement path being changed.

* * * * *